US010228090B2

(12) United States Patent
Bearsch et al.

(10) Patent No.: US 10,228,090 B2
(45) Date of Patent: Mar. 12, 2019

(54) FOLDABLE ARM

(71) Applicant: Skip Hop, Inc., New York, NY (US)

(72) Inventors: Benjamin Bearsch, Brooklyn, NY (US); Janet Villano, Jersey City, NJ (US); Ellen Diamant, New York, NY (US)

(73) Assignee: SKIP HOP, INC., New York, NY (US)

( * ) Notice: Subject to any disclaimer, the term of this patent is extended or adjusted under 35 U.S.C. 154(b) by 0 days.

(21) Appl. No.: 15/646,753

(22) Filed: Jul. 11, 2017

(65) Prior Publication Data

US 2019/0017654 A1  Jan. 17, 2019

(51) Int. Cl.
| | |
|---|---|
| *A63H 33/00* | (2006.01) |
| *A47D 15/00* | (2006.01) |
| *F16M 13/02* | (2006.01) |
| *A47D 9/00* | (2006.01) |

(52) U.S. Cl.
CPC ......... *F16M 13/022* (2013.01); *A63H 33/006* (2013.01); *A47D 9/00* (2013.01); *A47D 15/00* (2013.01); *F16M 2200/06* (2013.01)

(58) Field of Classification Search
CPC .............. A63H 33/006; Y10T 24/4417; Y10T 24/44923; F16M 13/022; F16M 2200/06
USPC .. 248/102, 104, 231.61, 231.71, 274.1, 103, 248/229.15, 229.22, 229.25, 231.51, 248/276.1; 24/455, 457, 563; 40/455, 40/617; 446/228, 246, 265, 227
See application file for complete search history.

(56) References Cited

U.S. PATENT DOCUMENTS

| | | | |
|---|---|---|---|
| 1,142,729 A | 6/1915 | Rathjen | |
| 1,688,765 A | 10/1928 | Veras | |
| 2,051,722 A | 8/1936 | Koch | |
| 2,529,173 A | 11/1950 | Moyer et al. | |
| 2,605,069 A * | 7/1952 | Gillaspy | A61J 9/0638 248/103 |

(Continued)

FOREIGN PATENT DOCUMENTS

GB   2508031   5/2014

OTHER PUBLICATIONS https://de.aliexpress.com/item/Baby-Pram-Crib-Activity-Arch-Plush-Elephant-Toy-Stroller-and-Travel-Activity-Bar-with-Rattle-and/32447943021.html?spm=2114.47010208.4.37.nGa7az, 1 page, Kinderbett Kinderwagen Blau Plüsch Elefant Reise Bogen Spielzeug Bar mit Rassel BB Gerät, accessed on Feb. 21, 2018.

(Continued)

*Primary Examiner* — Tan Le
(74) *Attorney, Agent, or Firm* — Stephen J. Weyer, Esq.; James R. Hayne, Esq.; Stites & Harbison, PLLC

(57) ABSTRACT

A foldable arm is provided including a central member with a longitudinal body having a proximal end and a distal end opposite the proximal end. A first member is pivotally connected to the proximal end of the longitudinal body of the central member and movable between a stored position substantially adjacent to the central member and a deployed position extending away from the central member. A second member is pivotally connected to the distal end of the longitudinal body of the central member and movable between a stored position in which the second member is nested within a recess define along the longitudinal body of the central member and a deployed position in which the second member extends away from the central member.

17 Claims, 5 Drawing Sheets

(56) References Cited

U.S. PATENT DOCUMENTS

| | | | |
|---|---|---|---|
| 3,856,251 A * | 12/1974 | Miller | F16M 11/10 |
| | | | 248/205.1 |
| 3,919,795 A | 11/1975 | Van Horne Jinivisian | |
| 4,214,808 A | 7/1980 | Hampson | |
| 5,370,570 A * | 12/1994 | Harris | A63H 33/006 |
| | | | 24/486 |
| 5,823,486 A | 10/1998 | Smith | |
| 6,068,535 A | 5/2000 | Hoyt | |
| 6,113,455 A | 9/2000 | Whelan et al. | |
| 6,386,490 B1 | 5/2002 | Suh | |
| 6,640,985 B1 | 11/2003 | Cheng | |
| 6,663,266 B2 * | 12/2003 | Huang | F16M 11/2064 |
| | | | 362/33 |
| 6,769,952 B1 | 8/2004 | Drosendahl et al. | |
| 6,860,786 B2 | 3/2005 | Oren et al. | |
| 7,025,654 B2 | 4/2006 | Oren et al. | |
| 7,183,929 B1 | 2/2007 | Antebi et al. | |
| 7,188,810 B1 | 3/2007 | Lasky | |
| 7,264,534 B2 | 9/2007 | Stubenfoll | |
| D594,913 S | 6/2009 | Oren et al. | |
| D599,861 S | 9/2009 | Oren et al. | |
| 7,610,704 B1 | 11/2009 | Nowicki | |
| RE41,121 E | 2/2010 | Asbach et al. | |
| 7,762,865 B2 | 7/2010 | Gelfond et al. | |
| D695,846 S | 12/2013 | Oren et al. | |
| 8,684,856 B2 | 4/2014 | Pyrce et al. | |
| 8,771,033 B2 | 7/2014 | Goszewski et al. | |
| 9,004,783 B1 * | 4/2015 | Woodman | F16M 11/00 |
| | | | 396/419 |
| 9,295,920 B2 | 3/2016 | Aboukrat et al. | |
| 9,757,660 B2 | 9/2017 | Leibovics et al. | |
| 2010/0311303 A1 | 12/2010 | Oren et al. | |
| 2012/0100776 A1 | 4/2012 | Jackson et al. | |
| 2013/0186310 A1 * | 7/2013 | Lymberis | A47B 96/025 |
| | | | 108/137 |
| 2014/0065925 A1 | 3/2014 | Oren et al. | |
| 2016/0038850 A1 | 2/2016 | Leibovics et al. | |
| 2016/0066709 A1 * | 3/2016 | Gottsleben | A47D 15/00 |
| | | | 5/93.1 |

OTHER PUBLICATIONS https://www.ebay.co.uk/p/Fisher-BHW57-Rainforest-Pushchair-Toy-Arch/2254421763, 1 page, Rainforest Pushchair Toy Arch, accessed Feb. 21, 2018.

https://www.amazon.com/Fisher-Price-Deluxe-Stroller-Activity-Center/dp/B00F2MQFNC, 1 page, Fisher-Price Deluxe Stroller Activity Center, accessed Feb. 21, 2018.

https://intl.target.com/p/oball-flex-n-go-activity-arch/-/A-17323046, 1 page, Oball Flex n Go Activity Arch, accessed on Feb. 21, 2018.

* cited by examiner

FOLDABLE ARM

FIELD OF INVENTION

The present invention relates to a portable means for hanging a children's assembly, and in particular, in the form of a foldable arm for hanging a children's entertainment assembly to another object.

BACKGROUND OF THE INVENTION

There are many products that allow for toys or other children's entertainment assemblies to hang above a child. For example, a typical mobile hangs either vertically downward from a fixture permanently mounted to a ceiling, or from a rigid arm that extends horizontally over a play or sleep area. In either instance, the means for hanging the mobile requires substantial time in installation and is not readily portable, for example, for use during travel. Furthermore, many such arms are design to attach to only one, or a small number of objects, and lack overall adjustability to be used in different settings.

What is needed in the art is a portable and adjustable means to hang a children's entertainment assembly.

SUMMARY OF THE INVENTION

A foldable arm made in accordance with the present invention is used to removably hang a children's entertainment assembly from another object. Specifically, in one exemplary embodiment, the foldable arm is connected to the side rail of a crib and is used to hang a mobile over the crib, as further discussed below.

The exemplary foldable arm includes a first member which is configured to removably secure the foldable arm to another object (e.g., the crib), a central member, and a second member configured to allow a children's entertainment assembly (e.g., the mobile) to hang therefrom.

With respect to the central member of the arm in particular, the central member includes a longitudinal body having a proximal end and a distal end opposite the proximal end. The longitudinal body defines a recess along a longitudinal axis of the central member between the proximal end and the distal end. Furthermore, the central member includes a support extending from the distal end of the longitudinal body at an angle relative to the longitudinal body with the support also defining a recess along the length of the support, as further discussed below.

Turning now to the first member of the arm in particular, the first member includes a proximal end and a distal end opposite the proximal end with the distal end of the first member pivotally connected to the proximal end of the longitudinal body of the central member. The first member is capable of pivoting relative to the central member between a first, deployed position and a second, stored position. To this end, the distal end of the first member defines a pivot hole which is operably connected to pivot holes at the proximal end of the longitudinal body of the central member. When the first member is in the deployed position, the first member extends away from the central member with a longitudinal axis of the first member at an oblique angle to the longitudinal axis of the central member. By comparison, when the first member is in the stored position, the first member is substantially adjacent to the central member with the longitudinal axis of the first member substantially parallel to the longitudinal axis of the central member. Furthermore, the distal end of the first member is configured to engage the proximal end of the longitudinal body of the central member to selectively maintain the first member in the deployed position, for example with the use of a push button.

At the proximal end of the first member, there is a closing mechanism configured to secure the arm to various objects, such as, for example, a crib, a stroller, a playpen, and other similar objects which would be in close proximity to a child at play or rest. More specifically, in some exemplary embodiments, the closing mechanism includes a locking ring and two claws that operate to selectively secure the arm to the side rail of the crib. By rotating the locking ring the claws are opened and closed as desired. Of course, it is contemplated that other closing mechanism can also be included in the arm without departing from the spirit and scope of the present invention.

Furthermore, the first member is comprised of a first portion, which includes the proximal end of the first member, and a second portion, which includes the distal end of the first member. The first portion and the second portion of the first member are rotationally connected to one another so that the first portion and the second portion can rotate relative to each other about the longitudinal axis of the first member, as further discussed below.

Referring now to the second member of the arm, the second member includes a proximal end and a distal end opposite the proximal end with the proximal end of the second member pivotally connected to the distal end of the longitudinal body of the central member. The second member consists primarily of a cylindrical main body, but the second member further includes a flange at the distal end of the second member and an intermediate collar extending around the main body at a distance away from the flange. The flange and intermediate collar maintain the location of the mobile relative to the second member, as further discussed below.

The second member is capable of pivoting relative to the central member between a first, deployed position and a second, stored position. To this end, the proximal end of the second member defines a pivot hole which is operably connected to pivot holes at the distal end of the longitudinal body of the central member. When the second member is in the stored position, the second member is substantially adjacent to the central member with a longitudinal axis of the second member substantially parallel to the longitudinal axis of the central member. In some embodiments, when the second member is in the stored position, the second member is nested within the recess of the longitudinal body of the central member such that the longitudinal axis of the second member is substantially aligned with the longitudinal axis of the central member. By comparison, when the second member is in the deployed position, the second member extends away from the central member with the longitudinal axis of the second member at an oblique angle to the longitudinal axis of the central member. In some embodiments, when the second member is in the deployed position, the second member is nested within the recess of the support.

In operation, the foldable arm is first provided in a stored configuration with both the first member and the second member in their respective stored positions, and the closing mechanism with the two claws in the open position. The first member and the second member are then pivoted into the deployed position. In particular, the first member is pivoted away from the central member and into the deployed position. Similarly, the second member is pivoted out of the recess of the central member and away from the central member until the second member is in the deployed position.

The closing mechanism is then used to secure the arm to another object, such as a crib. Of note, the first portion of the first member is therefore secured in place relative to the crib, but the second portion of the first member is rotatable relative to the first portion and thus the crib. As such, the second member of the arm can be pointed in any direction by rotating the first portion of the first member relative to the second portion of the first member. A children's entertainment assembly, such as a mobile, is then connected to the second member so as to hang above the crib within sight and/or reach of a child located in the crib.

BRIEF DESCRIPTION OF THE DRAWINGS

The present invention will now be described with regard to the drawings as follows.

DETAILED DESCRIPTION

The present invention will now be described with reference to the Figures. It will be appreciated that other foldable arm designs and appearances are possible which are consistent with the described function of the present foldable arm.

Figure 1:
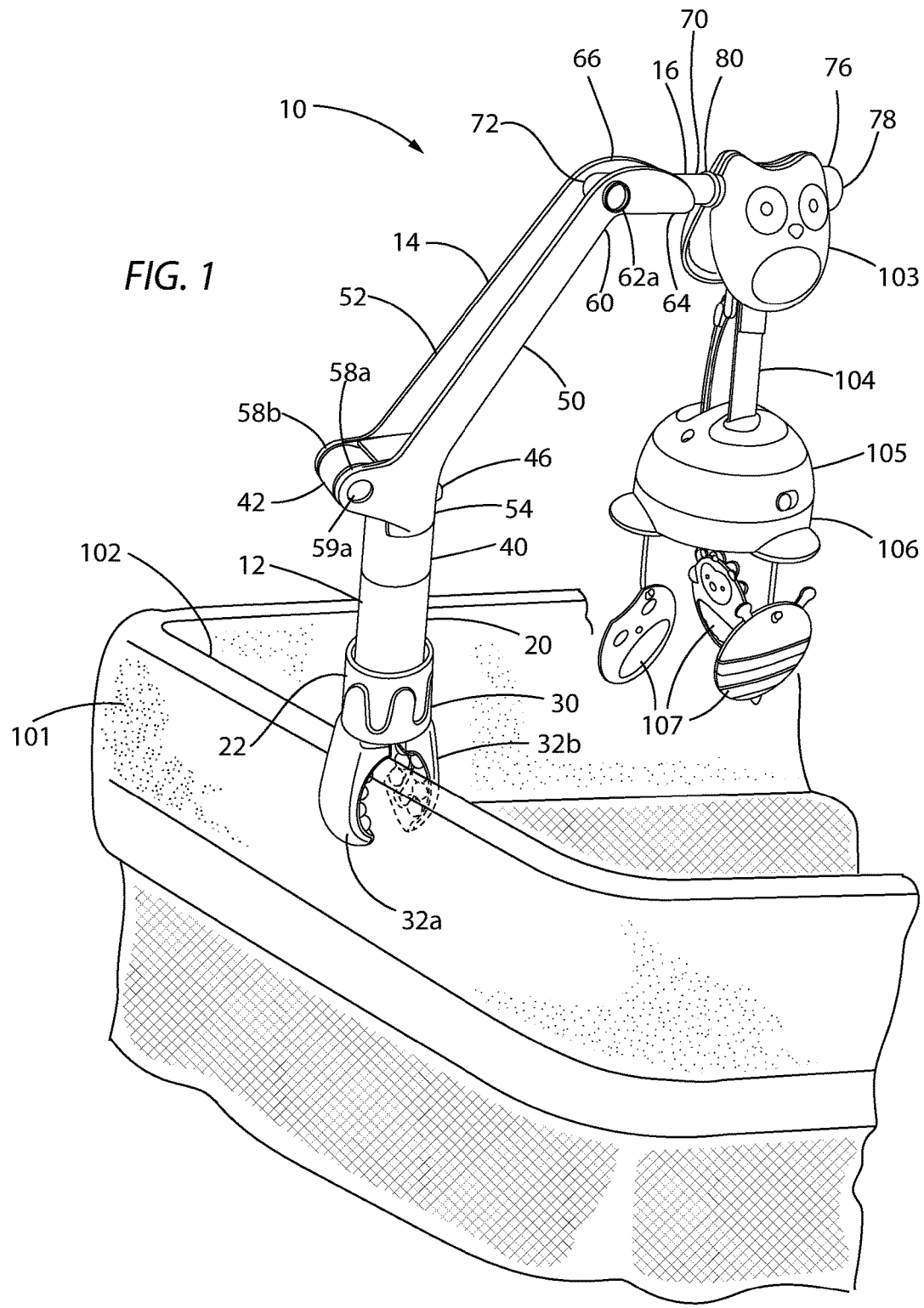
FIG. 1 is a front perspective view of a foldable arm made in accordance with the present invention being used to hang a mobile over a crib.

Referring first to FIG. 1, a foldable arm made in accordance with the present invention is used to removably hang a children's entertainment assembly from another object. Specifically, in the embodiment shown in FIG. 1, the foldable arm 10 is connected to the side rail 102 of a crib 101 and is used to hang a mobile 105 over the crib 101, as further discussed below.

Figure 2:
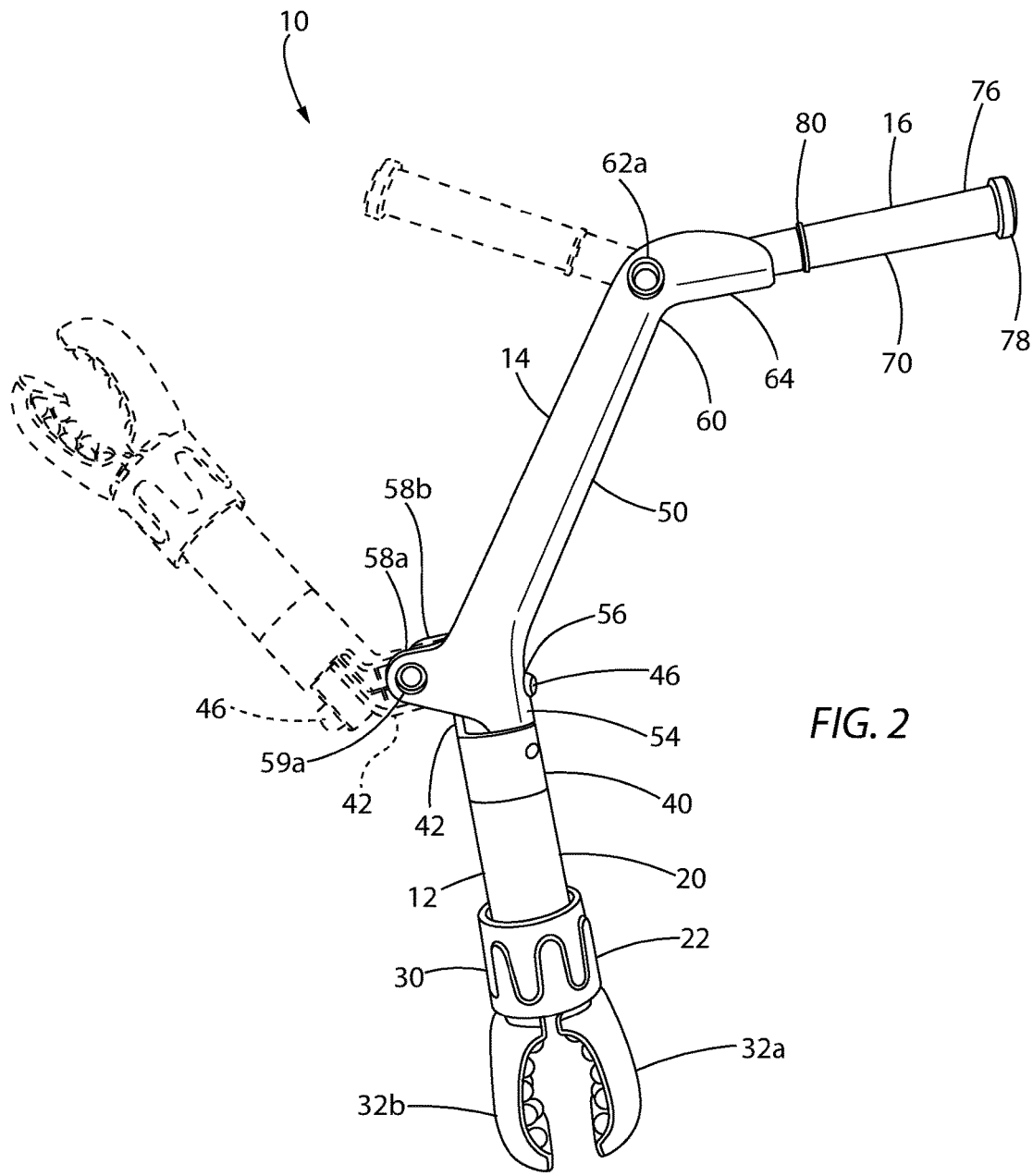
FIG. 2 is a front perspective view of the arm of FIG. 1 shown in isolation.
Figure 3:
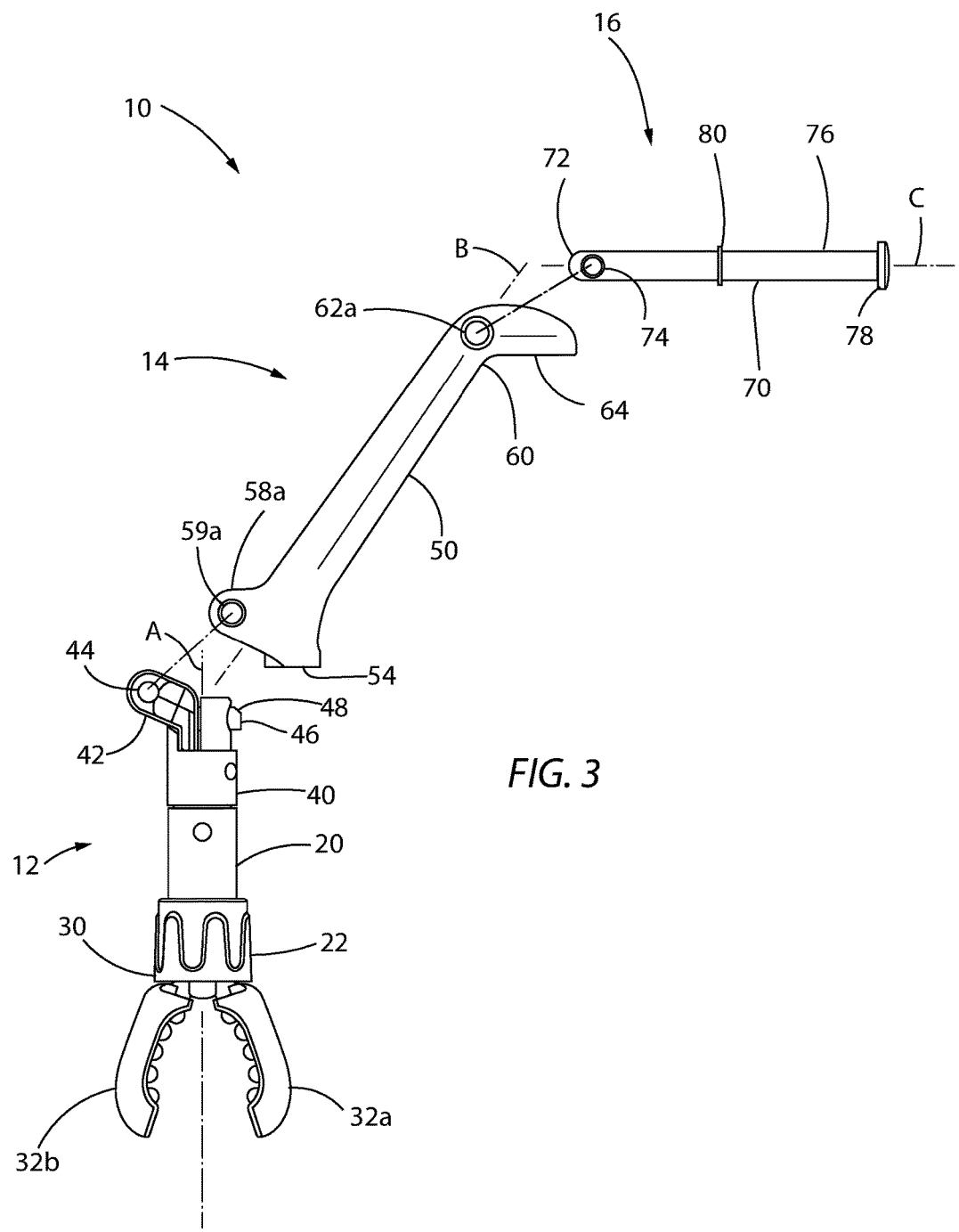
FIG. 3 is an exploded front view of the arm of FIG. 1.

Referring still to FIG. 1, but now additionally to FIGS. 2-3, the exemplary foldable arm 10 includes a first member 12 which is configured to removably secure the foldable arm 10 to another object (e.g., the crib 101), a central member 14, and a second member 16 configured to allow a children's entertainment assembly (e.g., the mobile 105) to hang therefrom.

With respect to the central member 14 of the arm 10 in particular, and referring still to FIGS. 1-3, the central member 14 includes a longitudinal body 50 having a proximal end 54 and a distal end 60 opposite the proximal end 54. As shown in FIG. 1, the longitudinal body 50 defines a recess 52 along a longitudinal axis B (shown in FIG. 3) of the central member 14 between the proximal end 54 and the distal end 60. The proximal end 54 of the longitudinal body 50 of the central member 14 includes two panel 58a, 58b which extend upward on either side of the recess 52. Each of the two panels 58a, 58b define a pivot hole 59a, 59b (pivot hole 59b shown in FIGS. 4-5) which allow the first member 12 to pivot relative to the central member 14, as further discussed below. Likewise, the distal end 60 of the longitudinal body 50 of the central member 14 defines a pivot hole 62a, 62b (pivot hole 62b shown in FIGS. 4-5) on each side of the recess 52 which allow the second member 16 to pivot relative to the central member 14, as further discussed below. Furthermore, the central member 14 includes a support 64 extending from the distal end 60 of the longitudinal body 50 at an angle relative to the longitudinal body 50 with the support 64 also defining a recess 66 (shown in FIG. 1) along the length of the support 64, as further discussed below.

Referring still to FIG. 1-3, but turning now to the first member 12 of the arm 10 in particular, the first member 12 includes a proximal end 22 and a distal end 42 opposite the proximal end 22 with the distal end 42 of the first member 12 pivotally connected to the proximal end 54 of the longitudinal body 50 of the central member 14.

Figure 4:
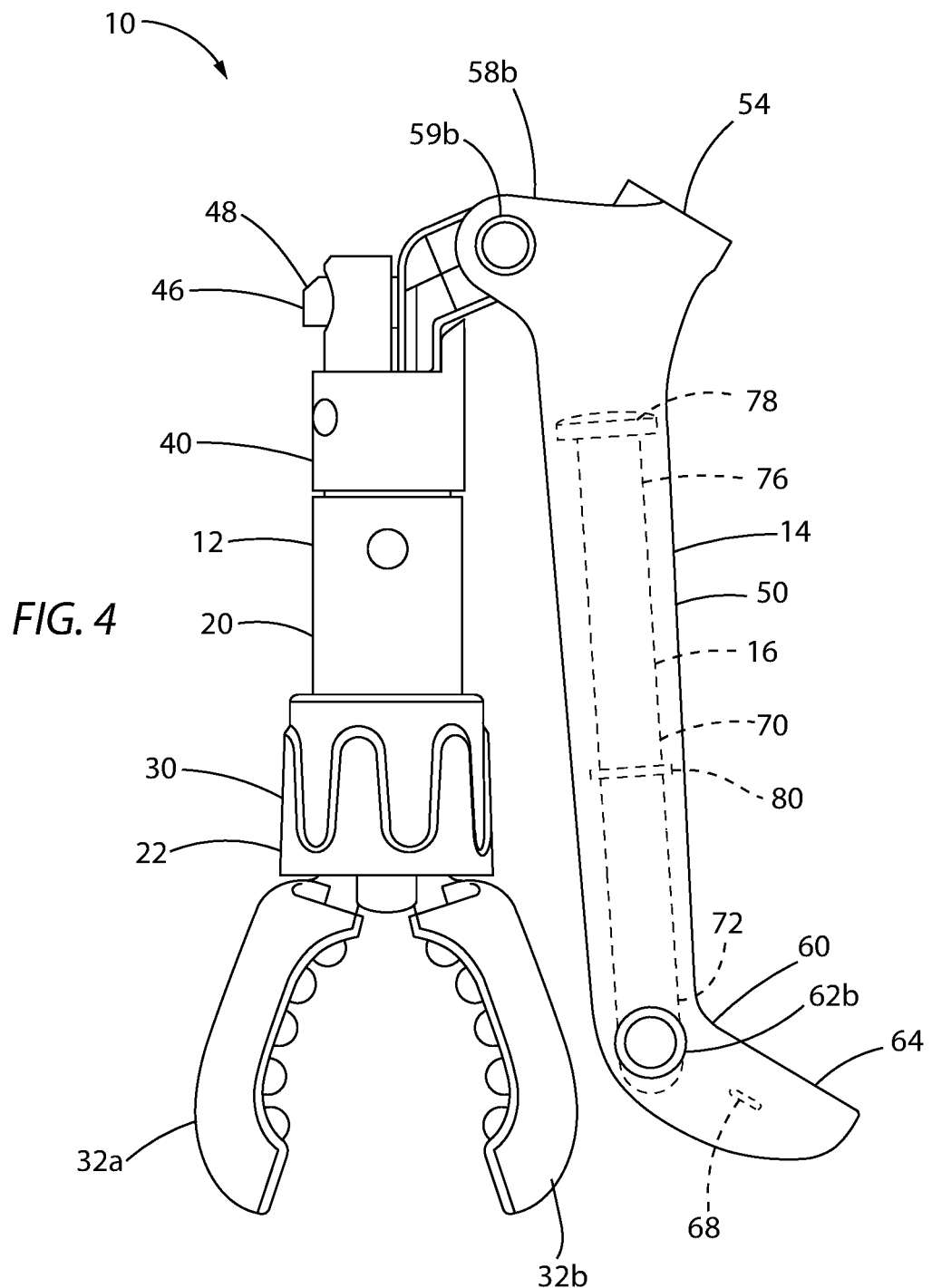
FIG. 4 is front view of the arm of FIG. 1 in a stored configuration.

Referring now specifically to FIG. 2-4, the first member 12 is capable of pivoting relative to the central member 14 between a first, deployed position (shown in FIG. 2) and a second, stored position (shown in FIG. 4). To this end, the distal end 42 of the first member 12 defines a pivot hole 44 (shown in FIG. 3) which is operably connected to the pivot holes 59a, 59b at the proximal end 54 of the longitudinal body 50 of the central member 14. That is to say, the distal end 42 of the first member 12 is positioned between the two panels 58a, 58b at the proximal end 54 of the longitudinal body 50 of the central member 14 with the pivot hole 44 of the first member 12 aligned with the pivot holes 59a, 59b of the central member 14. A pin, or the like, is then positioned through the pivot hole 44 of the first member 12 and the pivot holes 59a, 59b of the central member 14 to pivotally secure the first member 12 to the central member 14. Of course, other methods of pivotally connecting the first member 12 and the central member 14 are also contemplated. In any event, as shown in FIG. 2, when the first member 12 is in the deployed position, the first member 12 extends away from the central member 14 with a longitudinal axis A (shown in FIG. 3) of the first member 12 at an oblique angle to the longitudinal axis B of the central member 14. By comparison, as shown in FIG. 4, when the first member 12 is in the stored position, the first member 12 is substantially adjacent to the central member 14 with the longitudinal axis A of the first member 12 substantially parallel to the longitudinal axis B of the central member 14.

Furthermore, and referring now to FIGS. 1-4, the distal end 42 of the first member 12 is configured to engage the proximal end 54 of the longitudinal body 50 of the central member 14 to selectively maintain the first member 12 in the deployed position. To this end, the first member 12 further includes a push button 46 which, when the first member 12 is in the deployed position, engages a locking hole 56 (shown in FIG. 2) defined at the proximal end 54 of the longitudinal body 50 of the central member 14. The push button 46 is spring loaded such that, when the first member 12 is in the deployed position, the push button 46 is biased into an extended position within the locking hole 56. When the push button 46 is thus positioned within the locking hole 56, the first member 12 cannot pivot away from the deployed position, but upon depressing the push button 46 in towards the longitudinal axis A of the first member 12, the push button 46 exits the locking hole 56 and the first member 12 is able to pivot away from the deployed position and towards the stored position. Similarly, when pivoting the first member 12 from the stored position and into the deployed position, the push button 46 must first be depressed before the first member 12 can fully pivot into the deployed position. To this end, and as perhaps best shown in FIGS. 3-4, the push button 46 includes an inclined surface 48 which is engaged by the proximal end 54 of the longitudinal body 50 of the central member 14 as the first member 12 is pivoted towards the deployed position. As the proximal end 54 of the longitudinal body 50 of the central member 14 engages the inclined surface 48, the push button 46 is depressed until the first member is in the deployed position at which point the push button 46 is aligned with the locking hole 56 and is released into the exposed position within the locking hole 56.

Referring once again to FIGS. 1-3, at the proximal end 22 of the first member 12, there is a closing mechanism configured to secure the arm 10 to various objects, such as, for example, a crib, a stroller, a playpen, and other similar objects which would be in close proximity to a child at play or rest. More specifically, in the exemplary embodiment shown in FIG. 1, the closing mechanism includes a locking ring 30 and two claws 32a, 32b that operate to selectively secure the arm 10 to the side rail 102 of the crib 101. The two claws 32a, 32b are pivotally connected to the proximal end 22 of the first member 12 and biased into an open position which is shown in FIG. 3. The locking ring 30 surrounds the proximal end 22 of the first member 12 and is rotatable around the proximal end 22 of the first member 12. Although not expressly shown, the locking ring 30 engages threads on the proximal end 22 of the first member 12, such that upon rotating the locking ring 30 around the first member 12, the locking ring 30 also moves longitudinally along the length of the first member 12. By rotating the locking ring 30 in one direction, the locking ring 30 moves towards the proximal end 22 of the first member 12 which causes the claws 32a, 32b to move into a closed position which is shown in FIG. 2. By rotating the locking ring 30 in the opposite direction, the locking ring 30 moves away from the proximal end 22 of the first member 12 and the claws 32a, 32b return to the open position which is shown in FIG. 3. Of course, it is contemplated that other closing mechanism can also be included in the arm 10 without departing from the spirit and scope of the present invention.

Referring still to FIGS. 1-3, the first member 12 is comprised of a first portion 20, which includes the proximal end 22 of the first member 12, and a second portion 40, which includes the distal end 42 of the first member 12. The first portion 20 and the second portion 40 of the first member 12 are rotationally connected to one another so that the first portion 20 and the second portion 40 can rotate relative to each other about the longitudinal axis A of the first member 12, as further discussed below.

Referring now to FIGS. 1-5, the second member 16 of the arm 10 includes a proximal end 72 and a distal end 76 opposite the proximal end 72 with the proximal end 72 of the second member 16 pivotally connected to the distal end 60 of the longitudinal body 50 of the central member 14. The second member 16 consists primarily of a cylindrical main body 70, but the second member 16 further includes a flange 78 at the distal end 76 of the second member 16 and an intermediate collar 80 extending around the main body 70 at a distance away from the flange 78. The flange 78 and intermediate collar 80 maintain the location of the mobile 105 relative to the second member 16, as further discussed below.

Figure 5:
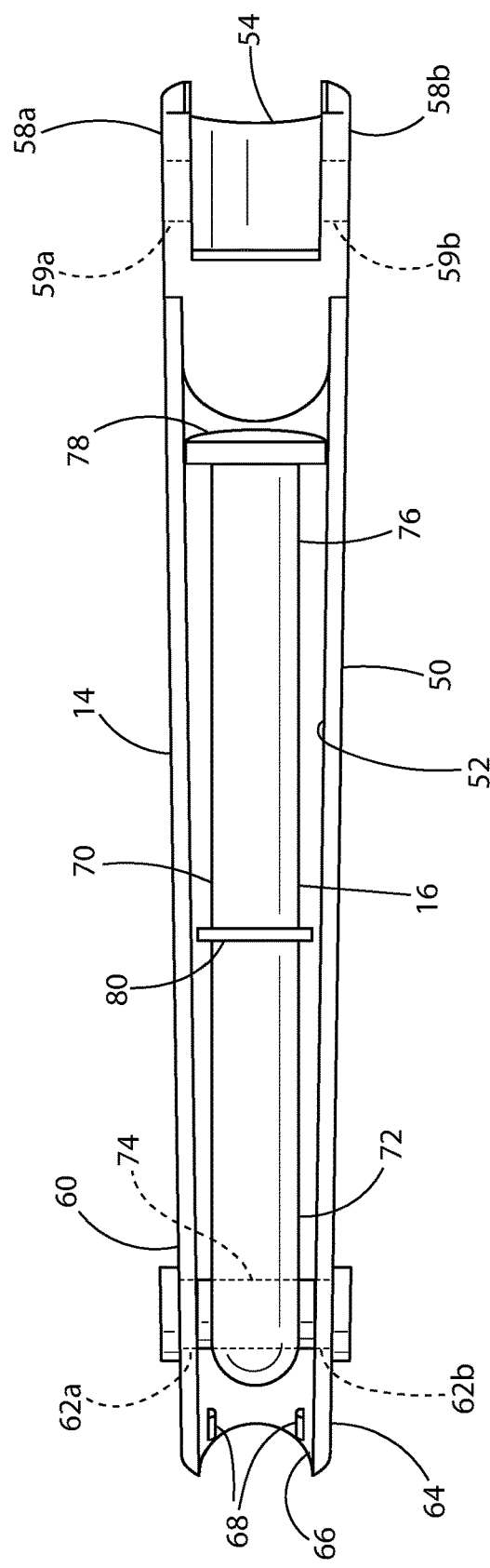
FIG. 5 is a top view of the central member and second member of the arm of FIG. 1 in a stored position.

Referring now specifically to FIGS. 2-5, the second member 16 is capable of pivoting relative to the central member 14 between a first, deployed position (shown in FIG. 2) and a second, stored position (shown in FIGS. 4-5). To this end, the proximal end 72 of the second member 16 defines a pivot hole 74 which is operably connected to the pivot holes 62a, 62b at the distal end 60 of the longitudinal body 50 of the central member 14. That is to say, and as perhaps best shown in FIG. 5, the proximal end 72 of the second member 16 is positioned within the recess 52 of the longitudinal body 50 of the central member 14 such that the pivot hole 74 of the second member 16 is aligned with the pivot holes 62a,62b defined through the central member 14 on each of the sides of the recess 52. A pin, or the like, is then positioned through the pivot hole 74 of the second member 16 and the pivot holes 62a, 62b of the central member 14 to pivotally secure the second member 16 to the central member 14. Of course, other methods of pivotally connecting the second member 16 and the central member 14 are also contemplated. In any event, when the second member 16 is in the stored position, the second member 16 is substantially adjacent to the central member 14 with a longitudinal axis C (shown in FIG. 3) of the second member 16 substantially parallel to the longitudinal axis B of the central member 14. More specifically, and as shown in FIGS. 4-5, when the second member 16 is in the stored position, the second member 16 is nested within the recess 52 of the longitudinal body 50 of the central member 14 such that the longitudinal axis C of the second member 16 is substantially aligned with the longitudinal axis B of the central member 14.

By comparison, and referring now specifically to FIG. 2, when the second member 16 is in the deployed position, the second member 16 extends away from the central member 14 with the longitudinal axis C of the second member 16 at an oblique angle to the longitudinal axis B of the central member 14. More specifically, when the second member 16 is in the deployed position, the second member 16 is nested within the recess 66 of the support 64. Furthermore, and referring now to FIGS. 4-5, two ribs 68 protrude from the support 64 within the recess 66 so as to engage the second member 16 when the second member 16 is in the deployed position and selectively maintain the second member 16 in the deployed position.

Referring now to FIGS. 1, 2, and 4 in particular, in operation, the foldable arm 10 is first provided in a stored configuration with both the first member 12 and the second member 16 in their respective stored positions, and the closing mechanism with the two claws 32a, 32b in the open position, as shown in FIG. 4. The first member 12 and the second member 16 are then pivoted into the deployed position. In particular, the first member 12 is pivoted away from the central member 14 until the push button 46 is released within the locking hole 56, maintaining the first member 12 in the deployed position. Similarly, the second member 16 is pivoted out of the recess 52 of the central member 14 and away from the central member 14 until the second member 16 enters the recess 66 of the support 64 and passes the two ribs 68 within the recess 66, maintaining the second member 16 in the deployed position. The claws 32a, 32b of the closing mechanism at the proximal end 22 of the first member 12 are then positioned on either side of an object, such as the side rail 102 of the crib 101 shown in FIG. 1, and the locking ring 30 is rotated to clamp the claws 32a, 32b around the side rail 102 of the crib 101, securing the arm 10 to the crib 101. Of note, the first portion 20 of the first member 12 is therefore secured in place relative to the crib 101, but the second portion 40 of the first member 12 is rotatable relative to the first portion 20 and thus the crib 101. As such, the second member 16 of the arm 10 can be pointed in any direction by rotating the first portion 20 of the first member 12 relative to the second portion 40 of the first member 12. The mobile 105, or other suitable children's entertainment assembly, is then connected to the second member 16 so as to hang above the crib 101 within sight and/or reach of a child located in the crib 101.

In the embodiment shown in FIG. 1, the mobile 105 is connected to the second member 16 by way of a spring clip 103 which can close around the second member 16 and a strap 104 extending between the spring clip 103 and the mobile 105. The spring clip 103 is sized so as to fit between the flange 78 at the distal end 76 of the second member 16 and the intermediate collar 80 positioned a distance away from the flange 78. As such, the flange 78 and intermediate collar 80 restrain movement of the spring clip 103 longitudinally along the length of the second member 16. Although not expressly show, when the clip 103 is closed, the clip 103 defines a substantially circular opening which surrounds the cylindrical main body 70 of the second member 16 and therefor allows the clip 103, and thus the mobile 105 to rotate relative to the second member 16 about the longitudinal axis C of the second member 16.

With respect to the mobile 105 itself, the bottom 106 of the mobile includes multiple hanging toys 107 and is configured to rotate. Along with this visually stimulating motion, the mobile 105 can include lights or noises which further improve the overall stimulation of the entertainment assembly.

One of ordinary skill in the art will recognize that additional embodiments are also possible without departing from the teachings of the presently-disclosed subject matter. This detailed description, and particularly the specific details of the exemplary embodiments disclosed herein, is given primarily for clarity of understanding, and no unnecessary limitations are to be understood therefrom, for modifications will become apparent to those skilled in the art upon reading this disclosure and can be made without departing from the spirit and scope of the presently-disclosed subject matter.

What is claimed:

1. A foldable arm for hanging a children's entertainment assembly, the foldable arm comprising:
    a central member including a longitudinal body having a proximal end and a distal end opposite the proximal end, the longitudinal body defining a recess along the longitudinal body between the proximal end and the distal end;
    a first member pivotally connected to the proximal end of the longitudinal body of the central member, the first member movable between a stored position substantially adjacent to the central member and a deployed position extending away from the central member; and
    a second member pivotally connected to the distal end of the longitudinal body of the central member, the second member movable between a stored position in which the second member is nested within the recess of the longitudinal body of the central member and a deployed position in which the second member extends away from the central member;
    wherein, the central member selectively maintains at least one of the first member in the deployed position, the second member in the deployed position, or both the first member in the deployed position and the second member in the deployed position; and
    wherein the central member defines a locking hole and the first member includes a spring button that engages the locking hole of the central member when the first member is in the deployed position.

2. The foldable arm of claim 1, wherein the first member is configured to removably secure the foldable arm to another object.

3. The foldable arm of claim 2, wherein the first member has a proximal end and a distal end opposite the proximal end, the distal end of the first member pivotally connected to the proximal end of the longitudinal body of the central member and the proximal end of the first member including a closing mechanism for connecting the foldable arm to the other object.

4. The foldable arm of claim 1, wherein the first member has a proximal end and a distal end opposite the proximal end, the distal end of the first member pivotally connected to the proximal end of the longitudinal body of the central member and the proximal end of the first member including a closing mechanism for connecting the foldable arm to another object.

5. The foldable arm of claim 1, wherein the central member further includes a support extending from the distal end of the longitudinal body at an angle relative to the longitudinal body, and wherein, when the second member is in the deployed position, the second member is positioned adjacent to the support.

6. The foldable arm of claim 5, wherein the support defines a recess along a length of the support and when the second member is in the deployed position, the second member is nested within the recess of the support.

7. The foldable arm of claim 6, further comprising one or more ribs which protrude from the support within the recess, the one or more ribs configured to engage the second member when the second member is in the deployed position.

8. The foldable arm of claim 1, wherein the second member has a proximal end and a distal end opposite the proximal end, the proximal end of the second member pivotally connected to the distal end of the longitudinal body of the central member, and the distal end of the second member includes a flange.

9. The foldable arm of claim 8, wherein the second member includes an intermediate collar positioned a distance away from the flange.

10. The foldable arm of claim 1, wherein, when the first member is in the stored position, a longitudinal axis of the first member is substantially parallel to, and positioned a distance away from, a longitudinal axis of the central member.

11. A foldable arm for hanging a children's entertainment assembly, the foldable arm comprising:
    a central member including a longitudinal body having a proximal end and a distal end opposite the proximal end, the longitudinal body defining a recess along the longitudinal body between the proximal end and the distal end;
    a first member pivotally connected to the proximal end of the longitudinal body of the central member, the first member movable between a stored position substantially adjacent to the central member and a deployed position extending away from the central member; and
    a second member pivotally connected to the distal end of the longitudinal body of the central member, the second member movable between a stored position in which the second member is nested within the recess of the longitudinal body of the central member and a deployed position in which the second member extends away from the central member;
    wherein, the central member selectively maintains at least one of the first member in the deployed position, the second member in the deployed position, or both the first member in the deployed position and the second member in the deployed position;
    wherein the first member has a proximal end and a distal end opposite the proximal end, the distal end of the first member pivotally connected to the proximal end of the longitudinal body of the central member and the proximal end of the first member including a closing mechanism for connecting the foldable arm to another object.

12. The foldable arm of claim 11, wherein the second member has a proximal end and a distal end opposite the proximal end, the proximal end of the second member pivotally connected to the distal end of the longitudinal body of the central member, and the distal end of the second member includes a flange.

13. The foldable arm of claim 12, wherein the second member includes an intermediate collar positioned a distance away from the flange.

14. A foldable arm for hanging a children's entertainment assembly, the foldable arm comprising:
a central member including a longitudinal body having a proximal end and a distal end opposite the proximal end, the longitudinal body defining a recess along the longitudinal body between the proximal end and the distal end;
a first member pivotally connected to the proximal end of the longitudinal body of the central member, the first member movable between a stored position substantially adjacent to the central member and a deployed position extending away from the central member; and
a second member pivotally connected to the distal end of the longitudinal body of the central member, the second member movable between a stored position in which the second member is nested within the recess of the longitudinal body of the central member and a deployed position in which the second member extends away from the central member;
wherein, the central member selectively maintains at least one of the first member in the deployed position, the second member in the deployed position, or both the first member in the deployed position and the second member in the deployed position;
wherein the central member further includes a support extending from the distal end of the longitudinal body at an angle relative to the longitudinal body, and wherein, when the second member is in the deployed position, the second member is positioned adjacent to the support.

15. The foldable arm of claim 14, wherein the first member has a proximal end and a distal end opposite the proximal end, the distal end of the first member pivotally connected to the proximal end of the longitudinal body of the central member and the proximal end of the first member including a closing mechanism for connecting the foldable arm to another object.

16. The foldable arm of claim 14, wherein the support defines a recess along a length of the support and when the second member is in the deployed position, the second member is nested within the recess of the support.

17. The foldable arm of claim 16, further comprising one or more ribs which protrude from the support within the recess, the one or more ribs configured to engage the second member when the second member is in the deployed position.

* * * * *